United States Patent
Ferlin et al.

(10) Patent No.: US 9,458,273 B2
(45) Date of Patent: Oct. 4, 2016

(54) METHOD FOR SYNTHESIZING POLYMERS FROM ACRYLIC ACID, ONE OF THE SALTS OF SAME OR THE MIXTURE THEREOF

(71) Applicant: RHODIA OPERATIONS, Paris (FR)

(72) Inventors: Patrick Ferlin, Paris (FR); James Wilson, Coye-la-Foret (FR); Fadila Benachich, Issy-les-Moulineaux (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/390,076

(22) PCT Filed: Apr. 3, 2013

(86) PCT No.: PCT/EP2013/056996
§ 371 (c)(1),
(2) Date: Oct. 2, 2014

(87) PCT Pub. No.: WO2013/150056
PCT Pub. Date: Oct. 10, 2013

(65) Prior Publication Data
US 2015/0112033 A1    Apr. 23, 2015

(30) Foreign Application Priority Data

Apr. 4, 2012  (FR) ...................................... 12 53110

(51) Int. Cl.
*C08F 220/06* (2006.01)
*C08F 120/06* (2006.01)
*C08F 4/40* (2006.01)

(52) U.S. Cl.
CPC ............... *C08F 220/06* (2013.01); *C08F 4/40* (2013.01); *C08F 120/06* (2013.01)

(58) Field of Classification Search
CPC ...................................................... C08F 220/06
See application file for complete search history.

(56) References Cited

U.S. PATENT DOCUMENTS 3,493,500 A * 2/1970 Volk et al. ..................... 210/734
3,658,772 A   4/1972 Volk et al.
5,597,509 A * 1/1997 Kirk et al. ..................... 510/223

FOREIGN PATENT DOCUMENTS

| EP | 0713890 A2 | 5/1996 |
| EP | 0713908 A1 | 5/1996 |
| FR | 2969155 A1 | 6/2012 |

* cited by examiner

*Primary Examiner* — Robert Harlan
(74) *Attorney, Agent, or Firm* — Osha Liang LLP (57) ABSTRACT

The present invention concerns a method for preparing a polymer comprising a step of radical polymerization of monomers comprising at least monomers (M1) chosen from acrylic acid, one of the salts of same, or the mixture thereof, in which said radical polymerization step is carried out:
continuously;
at a pH which remains between 3 and 5 during the polymerization step;
in the presence of a metabisulfite/persulfate redox pair, for example the sodium metabisulfite/sodium persulfate pair, as a radical initiator, with a metabisulfite/persulfate molar ratio of between 1 and 3.5 and an initiator/monomer molar percentage of between 5% and 18%.

20 Claims, 1 Drawing Sheet

METHOD FOR SYNTHESIZING POLYMERS FROM ACRYLIC ACID, ONE OF THE SALTS OF SAME OR THE MIXTURE THEREOF

CROSS-REFERENCE TO RELATED APPLICATIONS

The present application is a U.S. national stage entry under 35 U.S.C. §371 of International Application No. PCT/EP2013/056996 filed Apr. 3, 2013, which claims priority to FR Application No. 1253110 filed on Apr. 4, 2012, the whole content of each of these applications being herein incorporated by reference for all purposes.

TECHNICAL FIELD OF THE INVENTION

The present invention relates to a process for preparing polymers from acrylic acid, from a salt thereof or from a mixture thereof.

SUMMARY OF THE INVENTION

More specifically, the subject of the present invention is a process for preparing a polymer comprising a step of radical polymerization of monomers comprising at least monomers (M1) selected from acrylic acid, a salt thereof, or a mixture thereof, in which said radical polymerization step is carried out:
  continuously;
  at a pH which remains included from 3 to 5 during the polymerization step;
  in the presence of a metabisulfite/persulfate redox couple, as a radical initiator, with a metabisulfite/persulfate molar ratio included from 1 to 3.5 and an initiator/monomer molar percentage included from 5% to 18%.

The studies which have led to the present invention benefited from a grant from the European Union in the context of framework programme 7 under grant agreement NMP2-LA-2009-228867.

BRIEF DESCRIPTION OF THE DRAWINGS

For a detailed description of various embodiments and examples of the invention, reference will now be made to the accompanying drawings, in which The FIG. 1 illustrates the decrease in viscosity observed when small amounts respectively of polymer P6 and of Rhodoline® 270 are added.

DETAILED DESCRIPTION OF THE EMBODIMENTS

The studies which have been carried out by the inventors in the context of the present invention have now made it possible to demonstrate that, under the specific conditions defined below, the radical polymerization advantageously results in polymers of polyacrylate type which have a low weight-average molecular weights ($M_w$), typically of less than 10 000 g/mol, or even less than 7500 g/mol.

Furthermore, it turns out that the specific conditions for carrying out the process of the invention make it possible to finish the polymerization in a very short time (typically in less than a few minutes), consequently allowing the process to be carried out with a very short residence time in the reactor, which is reflected in particular in terms of reduced process costs.

In particular, given these advantages, the process of the invention provides an efficient and economical route of access to polymers of polyacrylate type.

In the context of the present description, a metabisulfite/persulfate redox couple is used. The metabisulfite is typically introduced in the form of sodium metabisulfite. The persulfate is, for its part, generally introduced in the form of an alkali metal (sodium or potassium) persulfate, an alkaline-earth metal persulfate or an ammonium persulfate. The redox couple used may typically be the sodium metabisulfite/sodium persulfate couple.

Unless otherwise mentioned, the term "initiator" or "radical initiator" denotes the metabisulfite/persulfate couple used in the radical polymerization step, this term encompassing the metabisulfite and the persulfate.

The salts of acrylic acid which can be used in the polymerization step of the invention can in particular be selected from sodium acrylate, potassium acrylate, ammonium acrylate and lithium acrylate.

According to one particular embodiment, the acrylic acid salt used in the polymerization step is sodium acrylate.

For the purposes of the present description, the term "monomer (M1)" denotes the monomer as it is under the pH conditions of the polymerization step. The monomer (M1) may be acrylic acid, a salt thereof or else a mixture of acrylic acid and of at least one acrylic acid salt or a mixture of several acrylic acid salts. For example, at a pH equal to the pKa of acrylic acid, the monomer (M1) is in the form of a mixture of acrylic acid and of at least one salt thereof, such as sodium acrylate, in equivalent proportions.

According to one particular embodiment, the monomer (M1) is in the form of an acrylic acid/sodium acrylate mixture.

According to the process of the invention, the polymerization reaction can be carried out in the presence of one or more monomer(s) other than acrylic acid, acrylic acid salts and mixtures of these compounds.

The radical polymerization reaction can in particular be carried out in the presence of at least one monomer (M2) different than the monomer (M1) and different than acrylic acid, then a salt thereof, or than a mixture thereof.

Preferably, the monomer (M2) is a monomer which has one or more functions or groups selected from the group consisting of: carboxylic acid; sulfonate; sulfate; phosphonate; phosphate; hydroxyl; primary, secondary, tertiary or quaternary amine; lactam; amide; ethylene glycol or polyalkylene oxide; carboxybetaine, sulfobetaine and phosphobetaines.

According to one particular embodiment, the monomer (M2) is selected from the group consisting of: (meth)acrylamide, dimethylacrylamide, morpholine N-oxide acrylamide, diacetone acrylamide, dimethylaminopropylacrylamide, N-(2-aminoethyl) methacrylamide hydrochloride, N-(hydroxymethyl)acrylamide, N-(2-hydroxypropyl)methacrylamide, N-hydroxyethylacrylamide, N-[tris(hydroxymethyl)methacrylamide, 4-acryloylmorpholine, 2-N-morpholinoethyl methacrylate, N-vinylpyrrolidone, methacrylamide, polyethylene glycol (meth)acrylate, diethylene glycol (meth)acrylate, di(ethylene glycol) ethyl ether acrylate, 2-(diethylamino)ethyl acrylate, 2-(dimethylamino) ethyl acrylate, 3-(dimethylamino)propyl acrylate, dipentaerythrityl penta-/hexaacrylate, 2-ethoxyethyl acrylate, ethylene glycol methyl ether acrylate, 2-hydroxyethyl acrylate, hydroxypropyl acrylate, poly(alkylene glycol) acrylate, 2-chloroethyl acrylate, tetrahydrofurfuryl acrylate, vinylacetamide, vinylformamide, vinylimidazole, vinylpyridine, diallylamine, N-methyl-N-vinylacetamide, 3-butene-1,2,3- tricarboxylic acid, vinylbenzoic acid, beta-carboxyethyl acrylate, methacrylic acid, maleic acid, succinnic acid, itaconic acid, [2-(acryloyloxy)ethyl]trimethylammonium chloride, diallyldimethylammonium chloride, (meth)acrylamidopropyltrimethylammonium chloride, 3-sulfopropyl (meth)acrylate, 2-propene-1-sulfonic acid, sodium 1-allyloxy-2-hydroxypropyl sulfonate (COPS1), 2-acrylamido-2-methylpropanesulfonic acid, (meth)allyl sulfonate, sodium vinyl sulfonate, sodium styrene sulfonate, 3-sulfopropyldimethyl-3-methacrylamidopropylammonium, N-(2-methacryloyloxyethyl)-N,N-dimethyl-N-(3-sulfopropyl)ammoniumbetaine, N-(2-1-(3-sulfopropyl)-2-vinylpyridiniumbetaine, monoacryloxyethyl phosphate, bis (2-methacryloxyethyl)phosphate, Sipomer PAM 100, 200, 400, 5000 (sold by Rhodia Solvay), vinylphosphonic acid, isopropylphosphonic acid, and diallylaminomethylene phosphonate.

In the context of the invention, and unless otherwise mentioned, the term "comprising from x to y" means that the limits x and y are included. For example, "a ratio included from 0.17 to 19" means that the ratio is greater than or equal to 0.17 and less than or equal to 19.

According to one embodiment, the radical polymerization step of the invention is carried out at a pH included from 3.5 to 5, preferably from 4.0 to 5 and preferentially from 4.4 to 4.9.

The sodium metabisulfite ($Na_2S_2O_5$) exhibits an equilibrium between various species depending on the pH value. The more the pH increases, the more the equilibrium shifts toward the $Na_2SO_3$ species, whereas the more the pH decreases, the more the equilibrium shifts toward the $SO_2$ species.

The pH range at which the radical polymerization step of the process of the present invention is carried out corresponds to conditions where:
- the formation of $SO_2$ is limited, thereby avoiding the formation of bubbles which, when formed, can create disparities in terms of residence time distribution and potential reaction control problems; and
- the formation of by-products, such as the Michael addition product obtained by reaction between acrylic acid and $NaHSO_3$, are avoided.

According to one preferential embodiment, in the polymerization step, the molar ratio between the metabisulfite and the persulfate is included from 1 to 2.5, preferentially less than or equal to 2.

According to one interesting variant, in the polymerization step of the process of the invention, the initiator/monomer(s) molar percentage is included from 3% to 10%, preferably from 4% to 9% and preferentially from 6% to 8.5%.

According to the invention, the monomers used may be solely monomers (M1), or else a mixture of monomers (M1) with other monomers (M2).

Thus, the initiator/monomers molar percentage corresponds to the (sodium metabisulfite and sodium persulfate)/(M1) molar percentage when only monomers (M1) are used, and to the (sodium metabisulfite and sodium persulfate)/(M1 and M2) molar percentage when monomers (M2) other than monomers (M1) are used.

According to one embodiment, the polymerization step is carried out at a pH of 4.2 to 4.9, for example at approximately 4.5 or at approximately 4.8.

According to one embodiment, the polymerization step is carried out at a metabisulfite/persulfate molar ratio of 1 to 2.

According to one embodiment, the polymerization step is carried out at an initiator/monomer(s) molar percentage of approximately 7%.

According to one embodiment, the polymerization step is carried out under the following conditions:
pH: 4.8,
metabisulfite/persulfate molar ratio: 1.90,
initiator/monomer(s) molar percentage: 7%.

According to one embodiment, the polymerization step is carried out under the following conditions:
pH: 4.46,
sodium metabisulfite/sodium persulfate molar ratio: 1.90,
initiator/monomer(s) molar percentage: 7%.

According to one embodiment, the polymerization step is carried out under the following conditions:
pH: 4.5,
sodium metabisulfite/sodium persulfate molar ratio: 2,
initiator/monomer(s) molar percentage: 7%.

In the context of the present description, the term "reagent content" denotes the ratio of the sum of the flow rates by weight of each of the reagents used in the radical polymerization step of the invention, relative to the total sum of the flow rates by weight entering the reactor. The reagents to which reference is made consist of the monomer(s), the metabisulfite and the persulfate. The flow rate by weight of a given reactor corresponds to the ratio of the weight of said reagent introduced into the reactor per unit of time, excluding the weight of the possible solvent carrying it (typically water). Thus, the reagent content is typically calculated by the following ratio:

$$\text{(total sum of the flow rates by weight entering the reactor}-\text{sum of the flow rates by weight of solvent entering the reactor)}/\text{(total sum of the flow rates by weight entering the reactor)}.$$

This reagent content corresponds to the theoretical solids content of the polymer obtained at the end of the polymerization step (for a yield of 100%). The real solids content at the end of the polymerization reaction, which is determined very simply, by eliminating the volatile liquid compounds (water, possible acrylic acid residues for example) by heating, is generally very close to this theoretical value.

Preferably, the polymerization step is carried out with a reagent content included from 30% to 65%. In particular, in order to obtain a good compromise between a high polymerization rate and good evacuation of the heat formed, this reagent content is preferably from 40% to 55%, for example from 40% to 48% by weight.

In the context of the present description, and unless otherwise mentioned, the term "polymerization rate" is intended to mean the rate at which the monomers are consumed. Moreover, the term "polymer production flow rate" is intended to mean herein the amount by weight of polymer produced per unit of time.

According to one embodiment, the polymerization step is carried out at a temperature which remains included from 30° C. to 100° C. throughout the polymerization. Since this polymerization step is exothermic, the temperature generally tends to increase during the polymerization. It is preferable for the polymerization to begin at a temperature of less than or equal to 80° C., for example between 50° C. and 80° C. Typically, the temperature remains less than or equal to 95° C., more preferentially less than or equal to 85° C., throughout the polymerization step. According to one advantageous embodiment, the temperature does not increase by more than 10° C., or even does not increase by more than 5° C., during the polymerization.

Typically, the polymerization step can be carried out in any reactor which allows a short residence time, typically less than 5 minutes, and efficient heat evacuation. In particular, the polymerization step is carried out in a reactor which has a high surface/volume ratio.

In the context of the invention, and unless otherwise mentioned, the "residence time" corresponds to the time between the moment when all the reagents are brought into contact in the reactor and the moment when the polymer obtained leaves said reactor. In practice, this residence time is calculated very simply, by the ratio of the volume of the reactor to the flow rate by volume exiting the reactor.

In the context of the invention, and unless otherwise mentioned, the term "reagents" is intended to mean all of the initiators and monomers used for the polymerization reaction. In particular, mention may be made of the metabisulfite, the persulfate, the acrylic acid, the sodium acrylate or the acrylic acid/sodium acrylate mixture.

According to the invention, the polymerization step can be carried out in a reactor selected from: a plate reactor, a tubular reactor or a microreactor which is appropriate.

According to one embodiment, the polymerization reaction is carried out in a tubular reactor.

Typically, the polymerization reactors can comprise at least one static mixer, making it possible to improve the heat transfer and the mixing of the reagents (initiator, monomer(s)) within the reactor.

In particular, the tubular reactor comprises at least one static mixer, such as a static mixer with internal cooling.

The polymerization according to the invention is generally carried out by injecting the monomers and the initiator in the form of various streams injected into the reactor, each comprising a solution comprising at least one compound selected from a monomer, a persulfate or a metabisulfite. According to certain embodiments, it is possible to inject one or more streams containing only diluting water, which makes it possible in particular to adjust the solids content in the reactor.

According to the invention, the monomer(s) optionally diluted with diluting water, can be heated to the reaction temperature by introduction into a thermostatic chamber downstream of the reactor, before injection into said reactor.

Typically, the metabisulfite and the persulfate are injected in the form of two distinct streams (without initial mixing of metabisulfite and persulfate in either of the two streams), the bringing together of the metabisulfite and of the persulfate preferably being carried out downstream of the injection of the monomers, generally after having brought the stream comprising the monomers to the reaction temperature.

According to a first possible embodiment, the persulfate and the metabisulfite are introduced in the form of two distinct streams which are injected into a stream comprising the monomers at the reaction temperature, at the same injection point.

According to another embodiment, the monomers and the persulfate, without metabisulfite, are introduced into a first zone of the reactor, typically in the form of two separate streams, and, downstream of this first zone of introduction of the monomers and of the persulfate, a stream comprising the metabisulfite is injected into the stream comprising the monomers and the persulfate brought to the reaction temperature. Typically, according to this variant, the persulfate is injected without metabisulfite, at a first injection point, into a stream comprising the monomers, and, downstream of this first point of injection of the persulfate, the metabisulfite is injected, at a second injection point, into the stream containing the monomers and the persulfate.

Alternatively, according to yet another embodiment that can be envisioned, the monomers and the metabisulfite, without persulfate, are introduced into a first zone of the reactor, and, downstream of this first zone of introduction of the monomers and of the metabisulfite, a stream comprising the persulfate is injected into the stream comprising the monomers and the metabisulfite brought to the reaction temperature.

According to one embodiment, the metabisulfite used in the polymerization step of the invention is a sodium metabisulfite, preferably injected into the reactor in the form of an aqueous solution.

According to one embodiment, the persulfate is an alkali metal (in particular sodium or potassium) persulfate or else an ammonium persulfate, advantageously injected into the reactor in the form of an aqueous solution. It is preferably a sodium persulfate injected into the reactor in the form of an aqueous solution.

According to one embodiment, the monomer (M1) is injected into the reactor in the form of an aqueous solution.

Alternatively, the monomer (M1) can be injected as it is into the reactor without being prediluted in water. According to this alternative mode, water is generally injected into the reactor (diluting water and/or water solubilizing other reagents, for instance the monomers (M2), the metabisulfites and/or the persulfates).

Likewise, the monomer(s) (M2) can be injected into the reactor in the form of an aqueous solution or else without being prediluted in water.

The process of the invention makes it possible to carry out the polymerization step with a very short reaction time, thereby making it possible to complete the polymerization step with very short residence times in the reactor, which can typically be less than 5 minutes, most commonly less than 2 minutes, or even less than one minute, and in certain cases less than 50 s.

In the context of the invention, and unless otherwise mentioned, the term "polymerization reaction time" or "reaction time" is intended to mean the time between bringing the various reagents into contact and the consumption of at least 95% of these monomers. At the end of this time resulting in the consumption of at least 95% of the monomers, the reaction is considered to be "complete" for the purposes of the present description. According to the invention, the polymerization reaction is completed with a very short reaction time, namely typically of less than 5 minutes, preferably of less than 2 min and preferentially of less than 50 s, thereby allowing the abovementioned very short residence times.

The process of the invention makes it possible to obtain polymers of polyacrylate type or copolymers based on monomers of acrylate type which have low weights, for example a low weight-average molar mass ($M_w$), typically less than 10 000 g/mol, and preferably less than 7500 g/mol, for example included from 1000 g/mol to 10 000 g/mol, in particular from 1500 g/mol to 7500 g/mol, and preferentially from 2000 g/mol to 6000 g/mol. The molecular weight $M_w$ values can be measured by GPC MALS.

According to one embodiment, the polymer obtained comprises less than 10% by weight of by-products, such as the product resulting from the Michael addition reaction between the monomers and certain forms of the metabisulfite in water, and preferably less than 5% by weight.

The process according to the invention may comprise, after the abovementioned radical polymerization step, an additional step of post-treatment of the polymer obtained. Thus, the polymer obtained at the end of the process according to the invention can be subjected to an additional post-treatment step carried out in the presence of additives, of biocides or of bases, such as NaOH.

This treatment step, also called finishing step, can be carried out in the same reactor as the one used in the polymerization step or else outside the reactor.

Whatever the embodiment of the process of the invention, the specific combination of the pH ranges, of the reducing/oxidizing couple: sodium metabisulfite/sodium persulfate, of the molar ratio thereof and of the initiator/monomer(s) molar percentage according to the invention advantageously and surprisingly makes it possible to complete the polymerization reaction in a very short time, typically less than 5 minutes, or even less than 1 minute.

Furthermore, this specific combination of parameters advantageously makes it possible to obtain polymers of low weight-average molecular weight ($M_w$).

The process according to the invention also has the advantage of providing access to polymers exhibiting very small amounts of by-products, and therefore polymers which have a high purity.

The specific combination of the pH, of the molar ratio and of the molar percentage according to the invention advantageously makes it possible to envision reducing the sizes of the reactors, compared with the prior art processes.

Thus, the process according to the invention proves to be a particularly efficient and economical route of access to polymers of polyacrylate type.

The polymers of polyacrylate type obtained according to the invention can be used in all the usual applications of this type of polymer, in particular as dispersing agents in an aqueous medium (for example to improve the fluidity of concentrated pigmented pastes, for instance pigmented $TiO_2$ pastes).

The examples that follow illustrate the invention without, however, limiting it.

EXAMPLES

Reactor

In the context of the examples hereinafter, use was made of a tubular reactor of millifluidic type, which comprises a Teflon tube spiraling around a metal cylinder (30 spirals). The temperature is controlled by a heat-transfer fluid circulating at the centre of said cylinder, in the opposite direction to the flow of the reagents that is brought to the reaction temperature (countercurrent circulation of Gilotherm oil with a maximum oil flow rate in the cylinder–the temperature of this heat-transfer fluid is set at a given value in each example). A metal device encircles the assembly.

The reactor used in the examples has the following characteristics:
Tube reference: ETFE/TEZEL ⅛"×0.093
External tube diameter: ⅛"=3.2 mm
Internal tube diameter: 0.062"=1.6 mm
Total length of the tube (reactor): 4.5 m
Tube volume: 9 ml The tube inlet has a T-shaped double injector which enables the joint injection into the tube of two streams, each one injected by a syringe which has a syringe driver which injects the streams with two constant flow rates, the values of which are specified in the examples hereafter. The two syringes contain, respectively:
in the first syringe connected to the inlet: a solution A, comprising the monomer(s), the composition of which is given hereinafter for each of the examples; and
in the second syringe connected to the inlet: diluting water (hereinafter denoted A') which is optionally introduced together with the solution A in some of the examples (for the other examples, the flow rate of injection of the diluting water A' is zero).

Downstream of this inlet, the tube has an injection zone which makes it possible to introduce, into the stream containing the monomers of which the temperature during the passage through the first part of the reactor:
a persulfate solution (hereinafter termed initiator solution 1 or solution B, the composition of which is given hereinafter for each of the examples); and
a metabisulfite solution (hereinafter termed initiator solution 2 or solution C, the composition of which is given hereinafter for each of the examples).

In the examples, the solutions B and C were injected into the stream at the same point, by means of a cross-shaped injector, but similar results are obtained by carrying out the injection of the solution B at a first injection point and the injection of the solution C at a second injection point downstream of the point of injection of the solution B.

In each example, the polymerization is carried out as follows:

The solution A containing the monomer was introduced at the inlet of the reactor with optionally co-injection of diluting water A', and the solutions B and C were injected downstream.

The solutions A, B and C, and the diluting water, where appropriate, were injected with constant flow rates specified for each one of the examples hereinafter.

In some of the examples, hydroquinone was introduced at the outlet of the reactor in order to interrupt the reaction and thus to be able to measure the conversion at the outlet of the reactor.

Example 1

Preparation of Polyacrylate (Polymer P1)

1.1) Preparation of the Solutions

Solution A

The monomer solution is prepared by reacting acrylic acid (6.64 mol) with an aqueous solution of sodium hydroxide at 50% by weight and in the presence of diluting water aimed at preventing crystallization. The pH of the monomer solution obtained is 4.8.

The composition of the solution A obtained is the following:

|  | mol | grams |
|---|---|---|
| Sodium acrylate | 2.35 | 220.9 |
| Acrylic acid | 4.29 | 309.3 |
| Water |  | 335.1 |

Solution B (Initiator 1—Sodium Persulfate)
An aqueous solution at 19.8% by weight was prepared by diluting sodium persulfate (14.85 g) in 60.2 g of water. The solution was degassed under vacuum for 10 minutes.

Solution C (Initiator 2—Sodium Metabisulfite)
An aqueous solution at 15.7% by weight was prepared by diluting sodium metabisulfite (11.75 g) in 63.3 g of water. The solution was degassed under vacuum for 10 minutes.

1.2) Polymerization

The polymerization was carried out under the following conditions:
injection flow rates:
solution A: 62.7 ml/h
diluting water: no injection solution B: 14.2 ml/h
solution C: 27.2 ml/h The following amounts were introduced during the reaction:

|  | Compounds | Weights introduced (g) |
|---|---|---|
| Solution A | Acrylic acid | 8.219 |
|  | Sodium acrylate | 5.870 |
|  | Water | 8.904 |
| diluting water |  | 0.000 |
| Initiator 1 | Sodium metabisulfite | 1.563 |
|  | Water | 8.418 |
| Initiator 2 | Sodium persulfate | 1.031 |
|  | Water | 4.183 |
|  | Hydroquinone | 0.066 |

| Molar ratios | |
|---|---|
| Persulfate/monomer | 2.45% |
| Metabisulfite/monomer | 4.66% |
| Metabisulfite/persulfate | 1.90 |
| Hydroquinone/persulfate | 0.1% |

Temperature

The temperature of the heat-transfer fluid was set at 72° C.

The variation in the temperature in the reactor was monitored over time:
1st spiral: 68° C.
2nd spiral: 85° C.
3rd spiral: 83° C.
4th spiral: 71° C.
5th spiral up to the 30th: 68° C.

The increase in the temperature corresponds to the heat given off by the polymerization reaction. The return to a temperature of 68° C. starting from the 5th spiral indicates that the polymerization reaction is complete starting from this spiral, thereby reflecting that the polymerization reaction was thus completed in less than 50 seconds.

1.3) The Product Obtained (Polymer P1)

The product obtained was characterized by the following measurements:

|  | Polymer |
|---|---|
| Theoretical solids content | 43.7% |
| Measured solids content[a] | 45.4% |
| Measured pH | 4.11 |
| Brookfield LVF viscosity (mPa · s) | — |
| Spindle 4; Shear Rate 20/50/100 at 23° C. |  |

[a]Thermobalance 115° C. for 1 hour

The obtained polymer P1 has a weight $M_w$ equal to 6550 g/mol. Furthermore, the analyses showed the presence of only 4.8% of addition product resulting from the Michael reaction.

Thus, the polymerization reaction carried out at a pH of 4.8, a sodium metabisulfite/sodium persulfate molar ratio of 1.90 and a (sodium metabisulfite+sodium persulfate)/monomer molar percentage of 7% advantageously resulted in a polymer having an $M_w$ equal to 6550 g/mol, in a residence time of less than 5 minutes.

Example 2

Preparation of Polyacrylate (Polymer P2)

2.1) Preparation of the Solutions

The solutions A, B and C of example 1 were used.

2.2) Polymerization

The polymerization was carried out under the following conditions:
injection flow rates:
solution A: 62.7 ml/h
diluting water: no injection
solution B: 14.2 ml/h
solution C: 27.2 ml/h The following amounts were introduced during the reaction:

|  | Compounds | Weights introduced (g) |
|---|---|---|
| Monomer | Acrylic acid | 25.404 |
|  | Sodium acrylate | 18.145 |
|  | Water | 27.523 |
| diluting water |  | 0.000 |
| Initiator 1 | Sodium metabisulfite | 4.830 |
|  | Water | 26.019 |
| Initiator 2 | Sodium persulfate | 3.188 |
|  | Water | 12.928 |
|  | Hydroquinone | 0.066 |

| Molar ratios | |
|---|---|
| Persulfate/monomer | 2.45% |
| Metabisulfite/monomer | 4.66% |
| Metabisulfite/persulfate | 1.90 |
| Hydroquinone/persulfate | 0% |

Temperature

The temperature of the heat-transfer fluid was set at 74° C.

The variation in the temperature in the reactor was monitored over time:
1st spiral: 68° C.
2nd spiral: 85° C.
3rd spiral: 83° C.
4th spiral: 71° C.
5th spiral up to the 30th: 68° C.

Here again, it is seen that, starting from the 5th spiral, the temperature returns to 68° C., thereby indicating that the reaction is already complete starting from this spiral. The polymerization reaction was thus completed in less than 50 seconds.

2.3) Product Obtained (Polymer P2)

The product obtained was characterized by the following measurements:

|  | Polymer |
|---|---|
| Theoretical solids content | 43.7% |
| Measured solids content[a] | 44.9% |
| Measured pH | 4.12 |
| Brookfield LVF viscosity (mPa · s) | 650/660/660 |
| Spindle 4; Shear Rate 20/50/100 at 23° C. |  |

[a]Thermobalance 115° C. for 1 hour

The product obtained can be neutralized by adding 16.7 ml of 50% sodium hydroxide (final pH of 7.43). The viscosity was once again measured at the end of the neutralization: Brookfield LVF viscosity (mPa·s) at 23° C. (spindle 4; shear rate 50/100): 400/390.

The polymer obtained at the end of the neutralization presents the following characteristics:

| | |
|---|---|
| pH | 7.41 |
| Solids content (%)[a] | 55.8 |
| Brookfield LVF viscosity (mPa · s) | 380 |
| $M_w$ (g/mol) | 6900 |
| $M_n$ (g/mol) | 3136 |
| Residual monomer (acrylic acid + sodium acrylate solution) | <20 ppm |

[a]Thermobalance 115° C. for 1 hour

Furthermore, the analyses showed the presence of only 3.2% of addition product resulting from the Michael reaction.

Thus, the polymerization reaction carried out at a pH of 4.8, a sodium metabisulfite/sodium persulfate molar ratio of 1.90 and a (sodium metabisulfite+sodium persulfate)/monomer molar percentage of 7% advantageously resulted in a polymer having an $M_w$ equal to 6900 g/mol, in a residence time of less than 5 minutes.

Example 3

Preparation of Polyacrylate (Polymer P3)

3.1) Preparation of the Solutions

Solution A

The monomer solution is prepared by reacting acrylic acid (1.67 mol) with an aqueous solution of sodium hydroxide at 50% by weight and in the presence of diluting water aimed at preventing crystallization. The pH of the monomer solution obtained is 4.46.

The composition of the solution A obtained is the following:

| | mol | grams |
|---|---|---|
| Sodium acrylate | 0.49 | 45.8 |
| Acrylic acid | 1.18 | 84.9 |
| Weight of water | | 62.2 |

Solution B (Initiator 1—Sodium Persulfate)

An aqueous solution at 22.2% by weight was prepared by diluting sodium persulfate (8.92 g) in 31.2 g of water. The solution was degassed under vacuum for 10 minutes.

Solution C (Initiator 2—Sodium Metabisulfite)

An aqueous solution at 17.6% by weight was prepared by diluting sodium metabisulfite (10.6 g) in 49.5 g of water. The solution was degassed under vacuum for 10 minutes.

3.2) Polymerization

The polymerization was carried out under the following conditions:

injection flow rates:
solution A: 62.7 ml/h
diluting water: 8.0 ml/h
solution B: 14.2 ml/h
solution C: 27.2 ml/h The following amounts were introduced for the reaction:

| Compounds | | Weights introduced (g) |
|---|---|---|
| Monomer | Acrylic acid | 10.122 |
| | Sodium acrylate | 5.462 |
| | Water | 7.410 |
| diluting water | | 2.933 |
| Initiator 1 | Sodium metabisulfite | 1.757 |
| | Water | 8.223 |
| Initiator 2 | Sodium persulfate | 1.160 |
| | Water | 4.054 |
| | Hydroquinone | — |

| Molar ratios | |
|---|---|
| Persulfate/monomer | 2.45% |
| Metabisulfite/monomer | 4.66% |
| Metabisulfite/persulfate | 1.90 |
| Hydroquinone/persulfate | 0.0% |

Temperature

The temperature of the heat-transfer fluid was set at 74° C.

The variation in the temperature in the reactor was monitored over time:
1st spiral: 75° C.
2nd spiral: 95° C.
3rd spiral: 80° C.
4th spiral: 71° C.
5th spiral up to the 30th: 66° C.

Here again, starting from the 5th spiral, the temperature returns to 66° C., indicating that the polymerization reaction is complete. The polymerization reaction was thus completed in less than 50 seconds.

3.3) Product Obtained (Polymer P3)

The product obtained was characterized by the following measurements:

| | Polymer |
|---|---|
| Theoretical solids content | 45% |
| Measured solids content[a] | 47.2% |
| Measured pH | 3.81 |
| Brookfield LVF viscosity (mPa · s) Spindle 4; Shear Rate 20/50/100 at 24° C. | 550/550/550 |

[a]Thermobalance 115° C. for 1 hour

The product obtained could be neutralized by adding 102.2 ml of 50% sodium hydroxide (final pH of 7.41). The viscosity was once again measured at the end of the neutralization: Brookfield LVF viscosity (mPa·s) at 23° C. (spindle 4; shear rate 50/100): 380/380.

The polymer obtained at the end of the neutralization presents the following characteristics:

| | |
|---|---|
| pH | 7.43 |
| Solids content (%)[a] | 53.7 |
| Brookfield LVF viscosity (mPa · s) | 390 |
| $M_w$ (g/mol) | 5800 |
| $M_n$ (g/mol) | 2300 |
| Residual monomer (acrylic acid + sodium acrylate solution) | <20 ppm | b) Thermobalance 115° C. for 1 hour

Furthermore, the analyses showed the presence of only 2.8% of addition product resulting from the Michael reaction.

Thus, the polymerization reaction carried out at a pH of 4.46, a sodium metabisulfite/sodium persulfate molar ratio of 1.90 and a (sodium metabisulfite+sodium persulfate)/monomer molar percentage of 7% advantageously resulted in a polymer having an $M_w$ equal to 5800 g/mol, in a residence time of less than 5 minutes.

Example 4

Preparation of Polyacrylate (Polymer P4)

4.1) Preparation of the Solutions

Solution A

The monomer solution is prepared by reacting acrylic acid (6.64 mol) with an aqueous solution of sodium hydroxide at 50% by weight and in the presence of diluting water aimed at preventing crystallization. The pH of the monomer solution obtained is 4.5.

The composition of the solution A obtained is the following:

|  | mol | grams |
|---|---|---|
| Sodium acrylate | 2.35 | 220.9 |
| Acrylic acid | 4.29 | 309.3 |
| water |  | 268.3 |

Solution B (Initiator 1—Sodium Persulfate)

An aqueous solution at 20.3% by weight was prepared by diluting sodium persulfate (15.2 g) in 59.7 g of water. The solution was degassed under vacuum for 10 minutes.

Solution C (Initiator 2—Sodium Metabisulfite)

An aqueous solution at 16.9% by weight was prepared by diluting sodium metabisulfite (12.7 g) in 62.3 g of water. The solution was degassed under vacuum for 10 minutes.

4.2) Polymerization

The polymerization was carried out under the following conditions:
injection flow rates:
 solution A: 62.7 ml/h
 diluting water: 4.2 ml/h
 solution B: 14.2 ml/h
 solution C: 27.5 ml/h
The following amounts were introduced for the reaction:

|  | Compounds | Weights introduced (g) |
|---|---|---|
| Monomer | Acrylic acid | 29.553 |
|  | Sodium acrylate | 21.109 |
|  | Water | 25.635 |
| diluting water |  | 5.098 |
| Initiator 1 | Sodium metabisulfite | 5.649 |
|  | Water | 27.749 |
| Initiator 2 | Sodium persulfate | 3.515 |
|  | Water | 13.786 |
|  | Hydroquinone | 0.066 |

| Molar ratios | |
|---|---|
| Persulfate/monomer | 2.3% |
| Metabisulfite/monomer | 4.7% |
| Metabisulfite/persulfate | 2 |
| Hydroquinone/persulfate | 0.0% |

Temperature

The temperature of the heat-transfer fluid was set at 74° C.

It was observed that the polymerization reaction was completed in less than 50 seconds.

4.3) Product Obtained

The product obtained was characterized by the following measurements:

|  | Polymer |
|---|---|
| Theoretical solids content | 45.3% |
| Measured solids content[a] | 47% |
| Measured pH | 4.6 |
| Brookfield LVF viscosity (mPa · s) at 18° C. | 252 |

[a]Thermobalance 115° C. for 1 hour

The obtained polymer P4 has a weight $M_w$ equal to 4850 g/mol. Furthermore, the analyses showed the presence of only 4.8% of addition product resulting from the Michael reaction.

Thus, the polymerization reaction carried out at a pH of 4.5, a sodium metabisulfite/sodium persulfate molar ratio of 2 and a (sodium metabisulfite+sodium persulfate)/monomer molar percentage of 7% advantageously resulted in a polymer having an $M_w$ equal to 4850 g/mol, in a residence time of less than 5 minutes.

Example 5

Preparation of Polyacrylate (Polymer P5)

5.1) Preparation of the Solutions

Solution A

The monomer solution is prepared by reacting acrylic acid (15.8 mol) with an aqueous solution of sodium hydroxide at 50% by weight and in the presence of diluting water aimed at preventing crystallization. The pH of the monomer solution obtained is 4.2.

The composition of the solution A obtained is the following:

|  | mol | grams |
|---|---|---|
| Sodium acrylate | 3.2 | 299.8 |
| Acrylic acid | 12.6 | 907.4 |
| Water |  | 394 |

Solution B (Initiator 1—Sodium Persulfate)

An aqueous solution at 24.5% by weight was prepared by diluting sodium persulfate (17.5 g) in 53.9 g of water. The solution was degassed under vacuum for 10 minutes.

Solution C (Initiator 2—Sodium Metabisulfite)

An aqueous solution at 20.1% by weight was prepared by diluting sodium metabisulfite (14.1 g) in 56.1 g of water. The solution was degassed under vacuum for 10 minutes.

5.2) Polymerization injection flow rates:
- solution A: 53.3 ml/h
- diluting water: 14 ml/h
- solution B: 15.4 ml/h
- solution C: 26 ml/h The following amounts were introduced for the reaction:

|  | Compounds | Weights introduced (g) |
|---|---|---|
| Monomer | Acrylic acid | 12.6 |
|  | Sodium acrylate | 4.2 |
|  | Water | 5.5 |
| diluting water |  | 5.1 |
| Initiator 1 | Sodium metabisulfite | 1.9 |
|  | Water | 7.6 |
| Initiator 2 | Sodium persulfate | 1.4 |
|  | Water | 4.3 |
|  | Hydroquinone | 0 |

| Molar ratios | |
|---|---|
| Persulfate/monomer | 2.7% |
| Metabisulfite/monomer | 4.6% |
| Metabisulfite/persulfate | 1.73 |
| Hydroquinone/persulfate | 0 |

Temperature

The temperature of the heat-transfer fluid was set at 60° C.

It was observed that the polymerization reaction was completed in less than one minute.

5.3) Product Obtained (Polymer P5)

The product obtained was characterized by the following measurements:

|  | Polymer |
|---|---|
| Theoretical solids content | 47.2% |
| Measured solids content[a] | 50% |
| Measured pH | 3.3 |
| Addition product | 2% |

[a] Thermobalance 115° C. for 1 hour

The polymer P5 obtained in this example has a weight-average molecular weight $M_w$ equal to 4617 g/mol.

Thus, the polymerization reaction results in a polymer of low molecular weight $M_w$ as in the previous examples, with a very low content of Michael addition products.

Furthermore, the polymer P6 obtained in this example (just like the polymers P1 to P4 of examples 1 to 4) have good dispersing properties. The dispersing properties of P5, in particular, are similar to those of an analogous commercial dispersing polymer, namely Rhodoline® 270 available from the company Rhodia.

Figure 1:
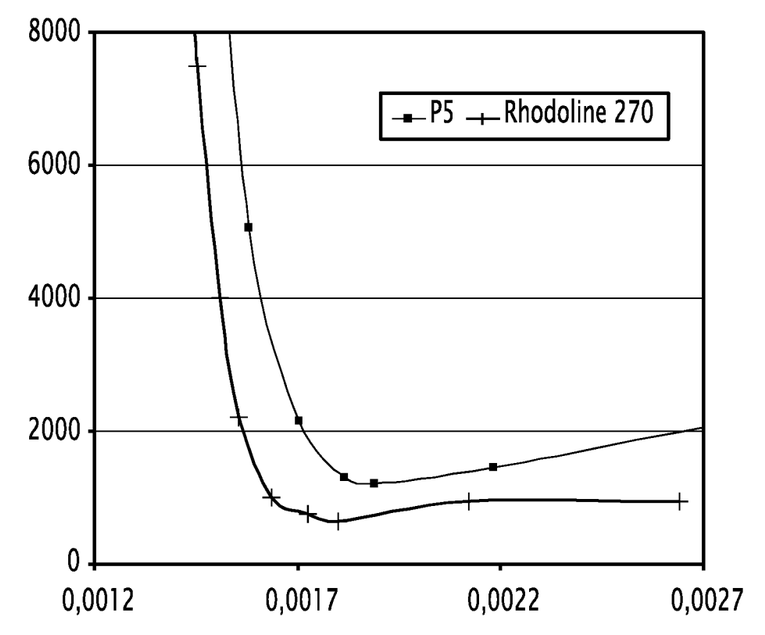

To illustrate these dispersing properties of the polymer, the polymer P5 was added to a dispersion of titanium oxide (Tiona® 595 available from the company Millenium). The FIGURE attached hereto illustrates the decrease in viscosity observed when small amounts respectively of polymer P6 and of Rhodoline® 270 are added. The FIGURE indicates, along the x-axis, the concentration of polymer added (% by weight relative to the weight of $TiO_2$) and, along the y-axis, the viscosity value (in cP, as measured using a Brookfield viscometer equipped with a module LV spindle 4, at 12 revolutions per minute).

Example 6 (Comparative)

Preparation of Polyacrylate (Polymer P6)

6.1) Preparation of the Solutions

Solution A

This is acrylic acid. In this example, the acrylic acid was introduced in a form not prediluted in water.

Solution B (Initiator 1—Sodium Persulfate)

An aqueous solution at 9.7% by weight was prepared by diluting sodium persulfate (3.87 g) in 36 g of water. The solution was degassed under vacuum for 10 minutes.

Solution C (Initiator 2—Sodium Metabisulfite)

An aqueous solution at 33.5% by weight was prepared by diluting sodium metabisulfite (16.75 g) in 33.3 g of water. The solution was degassed under vacuum for 10 minutes.

6.2) Polymerization injection flow rates:
- solution A: 8.4 ml/h
- diluting water: 1.3 ml/h
- solution B: 4.8 ml/h
- solution C: 10.4 ml/h The following amounts were introduced for the reaction:

|  | Compounds | Weights introduced (g) |
|---|---|---|
| Monomer | Acrylic acid | 4.35 |
|  | Water | 0.00 |
| diluting water |  | 0.672 |
| Initiator 1 | Sodium metabisulfite | 1.792 |
|  | Water | 3.562 |
| Initiator 2 | Sodium persulfate | 0.239 |
|  | Water | 2.231 |
|  | Hydroquinone | 0.115 |

| Molar ratios | |
|---|---|
| Persulfate/monomer | 1.7% |
| Metabisulfite/monomer | 15.6% |
| Metabisulfite/persulfate | 8.8 |
| Hydroquinone/persulfate | 1.0 |

Temperature

The temperature of the heat-transfer fluid was set at 90.5° C.

The residence time in the reactor is more than 20 minutes.

6.3) Product Obtained (Polymer P6)

The product obtained was characterized by the following measurements:

|  | Polymer |
|---|---|
| Theoretical solids content | 49.7% |
| Measured solids content[a] | 47% |
| Measured pH | 2.1 |
| Addition product | 13% |
| Brookfield LVF viscosity (mPa · s) | 110 |
| Spindle 4; Shear Rate 20/50/100 at 23° C. | |

[b] Thermobalance 115° C. for 1 hour

The polymer obtained has a weight-average molecular weight $M_w$ equal to 13 500 g/mol.

Thus, the polymerization reaction carried out at a pH of 2 and a sodium metabisulfite/sodium persulfate molar ratio of 8.8 results in a polymer with a molecular weight $M_w$ of greater than 10 000 g/mol. Furthermore, the analyses showed the presence of 13% of addition product resulting from the Michael reaction, in the polymer obtained.

Example 7 (Comparative)

Preparation of the Polymer P7

7.1) Preparation of the Solutions

Solution A

The monomer solution is prepared by reacting acrylic acid (1.67 mol) with an aqueous solution of sodium hydroxide at 50% by weight and in the presence of diluting water aimed at preventing crystallization. The pH of the monomer solution obtained is 5.5.

The composition of the solution A obtained is the following:

|  | mol | grams |
|---|---|---|
| Sodium acrylate | 1.15 | 108.1 |
| Acrylic acid | 0.52 | 37.2 |
| Water |  | 137.7 |

Solution B (Initiator 1—Sodium Persulfate)

An aqueous solution at 15.2% by weight was prepared by diluting sodium persulfate (4.57 g) in 25.5 g of water. The solution was degassed under vacuum for 10 minutes.

Solution C (Initiator 2—Sodium Metabisulfite)

An aqueous solution at 12.0% by weight was prepared by diluting sodium metabisulfite (7.2 g) in 52.88 g of water. The solution was degassed under vacuum for 10 minutes.

7.2) Polymerization

The polymerization was carried out under the following conditions:
injection flow rates:
  solution A: 62.7 ml/h
  diluting water: 0 ml/h
  solution B: 14.2 ml/h
  solution C: 27.2 ml/h The following amounts were introduced for the reaction:

|  | Compounds | Weights introduced (g) |
|---|---|---|
| Monomer | Acrylic acid | 9.063 |
|  | Sodium acrylate | 26.353 |
|  | Water | 35.565 |
| diluting water |  | 0.0 |
| Initiator 1 | Sodium metabisulfite | 3.596 |
|  | Water | 26.346 |
| Initiator 2 | Sodium persulfate | 2.379 |
|  | Water | 13.263 |
|  | Hydroquinone | — |

| Molar ratios | |
|---|---|
| Persulfate/monomer | 2.46% |
| Metabisulfite/monomer | 4.66% |
| Metabisulfite/persulfate | 1.9 |
| Hydroquinone/persulfate | 0.0 |

Temperature

The temperature of the heat-transfer fluid was set at 74° C.

7.3) Product Obtained

The product obtained was characterized by the following measurements:

|  | Polymer |
|---|---|
| Theoretical solids content | 36.1% |
| Measured solids content[a] | 37.9% |
| Measured pH | 4.92 |
| Brookfield LVF viscosity (mPa · s) Spindle 4; Shear Rate 20/50/100 at 23° C. | 1050/1040/1030 |

[a] Thermobalance 115° C. for 1 hour

The obtained polymer P7 has a molecular weight $M_w$ equal to 60 850 g/mol. Furthermore, the analyses showed the presence of 4.3% of addition product resulting from the Michael reaction.

Thus, the polymerization reaction carried out at a pH of 5.5, a sodium metabisulfite/sodium persulfate molar ratio of 1.9 and a (sodium metabisulfite+sodium persulfate)/monomer molar percentage of 7% resulted in a polymer having a high $M_w$, namely 60 850 g/mol.

The invention claimed is:

1. A process for preparing a polymer comprising a step of radical polymerization of monomers comprising at least monomers (M1) selected from a group consisting of acrylic acid, a salt thereof, and a mixture thereof, wherein said radical polymerization step is carried out:
   continuously;
   at a pH which remains included from 3 to 5 during the polymerization step;
   in the presence of a metabisulfite/persulfate redox couple, as a radical initiator, with a metabisulfite/persulfate molar ratio included from 1 to 3.5 and an initiator/monomer molar percentage included from 5% to 18%.

2. The process as claimed in claim 1, wherein the pH is included from 3.5 to 5.

3. The process as claimed in claim 1, wherein the sodium metabisulfite/sodium persulfate molar ratio is included from 1 to 2.5.

4. The process as claimed in claim 1, wherein the molar percentage is included from 3% to 10%.

5. The process as claimed in claim 1, wherein the polymerization step is carried out at a temperature which remains included from 30° C. to 100° C. throughout the polymerization.

6. The process as claimed in claim 1, wherein the polymerization is carried out in a tubular reactor, a plate reactor or a microreactor which is appropriate.

7. The process as claimed in claim 6, wherein the tubular reactor comprises at least one static mixer.

8. The process as claimed in claim 1, wherein the polymerization step is carried out with a residence time of less than 5 minutes.

9. The process as claimed in claim 1, wherein the polymer obtained has a weight-average molar mass included from 1000 g/mol to 10 000 g/mol.

10. The process as claimed in claim 1, wherein the polymer obtained is subjected to an additional post-treatment step in the presence of additives, of biocides or of bases.

11. The process as claimed in claim 1, wherein the radical polymerization reaction is carried out in the presence of at least one monomer (M2), said monomer (M2) being different than the monomer (M1).

12. The process as claimed in claim 11, wherein the monomer (M2) is a monomer which has one or more functions or groups selected from the group consisting of: carboxylic acid; sulfonate; sulfate; phosphonate; phosphate; hydroxyl; primary, secondary, tertiary or quaternary amine; lactam; amide; ethylene glycol or polyalkylene oxide; carboxybetaine, sulfobetaine and phosphobetaines.

13. The process as claimed in claim 1, wherein said metabisulfite/persulfate redox couple is the sodium metabisulfite/sodium persulfate couple.

14. The process as claimed in claim 1, wherein the pH is included from 4.0 to 5.

15. The process as claimed in claim 1, wherein the pH is included from 4.4 to 4.9.

16. The process as claimed in claim 1, wherein the sodium metabisulfite/sodium persulfate molar ratio is less than or equal to 2.

17. The process as claimed in claim 1, wherein the molar percentage is included from 6% to 8.5%.

18. The process as claimed in claim 1, wherein the polymerization step is carried out with a residence time of less than 2 minutes.

19. The process as claimed in claim 1, wherein the polymer obtained has a weight-average molar mass included from 1500 g/mol to 7500 g/mol.

20. The process as claimed in claim 1, wherein the polymer obtained has a weight-average molar mass included from 2000 g/mol to 6000 g/mol.

* * * * *